No. 630,616. Patented Aug. 8, 1899.
A. T. MARSHALL.
AUTOMATIC REFRIGERATING APPARATUS.
(Application filed June 4, 1897.)

(No Model.) 5 Sheets—Sheet 1.

Fig. 1.

Witnesses.
W. J. Baldwin
E. M. Healy

Inventor.
A. T. Marshall.
By
Southgate & Southgate
Attorneys.

Fig. 2.

No. 630,616. Patented Aug. 8, 1899.
A. T. MARSHALL.
AUTOMATIC REFRIGERATING APPARATUS.
(Application filed June 4, 1897.)
(No Model.) 5 Sheets—Sheet 4.

No. 630,616. Patented Aug. 8, 1899.
A. T. MARSHALL.
AUTOMATIC REFRIGERATING APPARATUS.
(Application filed June 4, 1897.)
(No Model.) 5 Sheets—Sheet 5.

UNITED STATES PATENT OFFICE.

ALBERT T. MARSHALL, OF BROCKTON, MASSACHUSETTS.

AUTOMATIC REFRIGERATING APPARATUS.

SPECIFICATION forming part of Letters Patent No. 630,616, dated August 8, 1899.

Application filed June 4, 1897. Serial No. 639,428. (No model.)

*To all whom it may concern:*

Be it known that I, ALBERT T. MARSHALL, a citizen of the United States, residing at Brockton, in the county of Plymouth and State of Massachusetts, have invented a new and useful Improvement in Automatic Refrigerating Apparatus, of which the following is a specification.

My invention relates to that class of refrigerating-machines which ordinarily employ anhydrous ammonia as a refrigerating medium; and the objects of my invention are, first, to provide means for automatically regulating the admission of the refrigerating medium to the expansion pipes or chambers; second, to combine a thermostat and rheostat to automatically control the motor which drives the pump, so that the pump will be actuated to maintain a constant temperature in the refrigerated space; third, to provide means for automatically cutting out the motor under certain conditions, and, fourth, to provide means for automatically regulating the circulation of water employed for cooling the refrigerating medium.

In this application for patent I do not claim, however, the specific details of the combined thermostat and rheostat which I have illustrated herein; nor do I claim any specific details of the construction of the automatic cut-out devices shown, as in my companion application, filed August 29, 1898, Serial No. 689,749, I have shown and claimed a specific construction of combined thermostat and rheostat and specific forms of cut-out devices for controlling the same.

To these ends my invention consists of the parts and combinations of parts, as hereinafter described, and more particularly pointed out in the claims at the end of this specification.

In the accompanying five sheets of drawings, Fig. 5 is a transverse sectional view illustrating the combined thermostat and rheostat which I preferably employ for controlling the electric motor which drives the pump. Fig. 8 is a detail view, to be hereinafter referred to.

A refrigerating apparatus constructed according to my invention comprises a storage-chamber for liquid anhydrous ammonia or other refrigerating medium, the expansion pipes or coils in which the liquid ammonia is allowed to expand into the form of a gas, and a pump for drawing the refrigerating medium from the expansion-pipes and condensing it back to a liquid after the same has been cooled preferably by means of a circulation of water.

The expansion pipes or coils are preferably immersed in a brine-tank; but, if desired, the brine-tank may be omitted, and the expansion pipes or coils alone may be located directly in the space to be refrigerated.

The parts may be of any of the ordinary or approved constructions, and while in the accompanying drawings I have illustrated my invention applied to a comparatively small cabinet refrigerator or chest it is to be understood that my inventions are equally applicable to the larger forms of ice or refrigerating machines.

To control the admission of refrigerating medium to the expansion-pipes, I preferably employ a needle-valve for throttling or regulating the flow of the expansion medium, and I automatically operate said needle-valve by the combined action of two diaphragms, one diaphragm being acted upon by the pressure of the expansion medium on the suction side of the pump and the other diaphragm being acted upon by the pressure of a body of expansion medium confined in a closed vessel.

The hand-actuated shut-off valves which I may employ at various points in the ammonia-circulating pipes are preferably provided with diaphragms, which may be screwed down into engagement with suitable valve-seats.

In practice I preferably drive the pump by means of an electric motor, and in order to maintain a constant temperature in the refrigerated space I control the electric motor by means of a thermostatic rod. In some cases the thermostatic rod may be connected to simply start and stop the motor; but in practice I prefer to combine the thermostatic bar with a spring-actuated rheostat in order that the motor may be started up slowly and the full strength of the current turned on gradually.

To cool the condensed refrigerating medium, I preferably employ a circulation of water, and I control the admission of water to the cooling-chamber by means of a needle-valve, which is automatically actuated by a diaphragm controlled by the pressure of the refrigerating medium. If the supply of water should fail or should be shut off and the pump should continue in action, a heavy pressure might be generated in the condensing-coil, and in order to prevent this from happening I preferably provide a safety cut-out device for stopping the motor when the water-supply is shut off.

Figure 1:
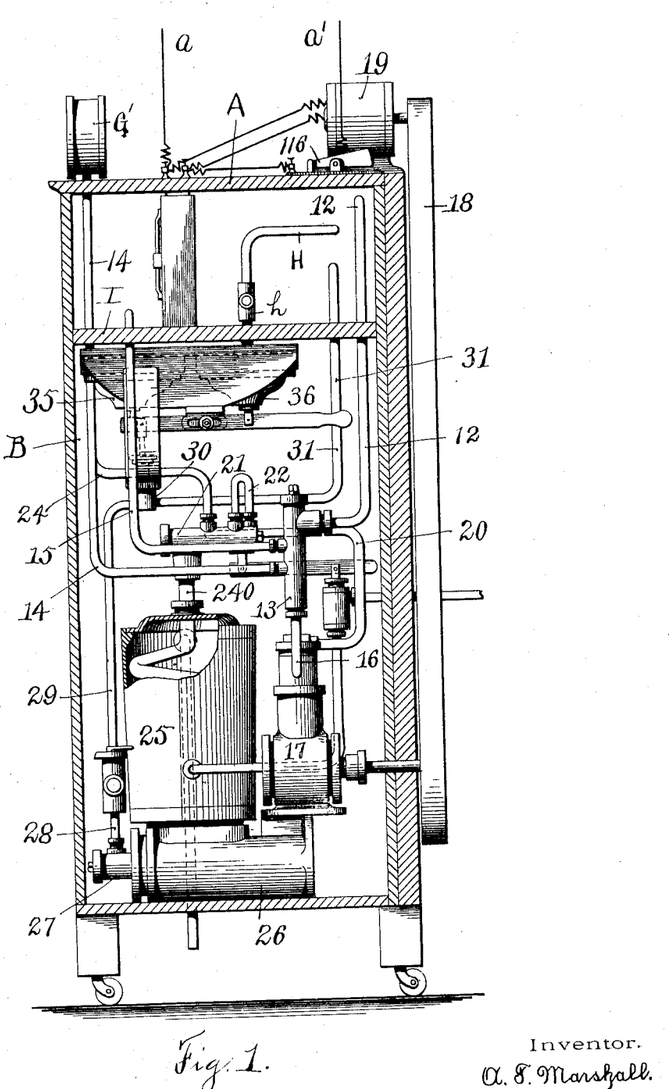
Figure 1 is a longitudinal sectional view of a refrigerating apparatus constructed according to my invention, the water-circulating pipes being omitted.
Figure 2:
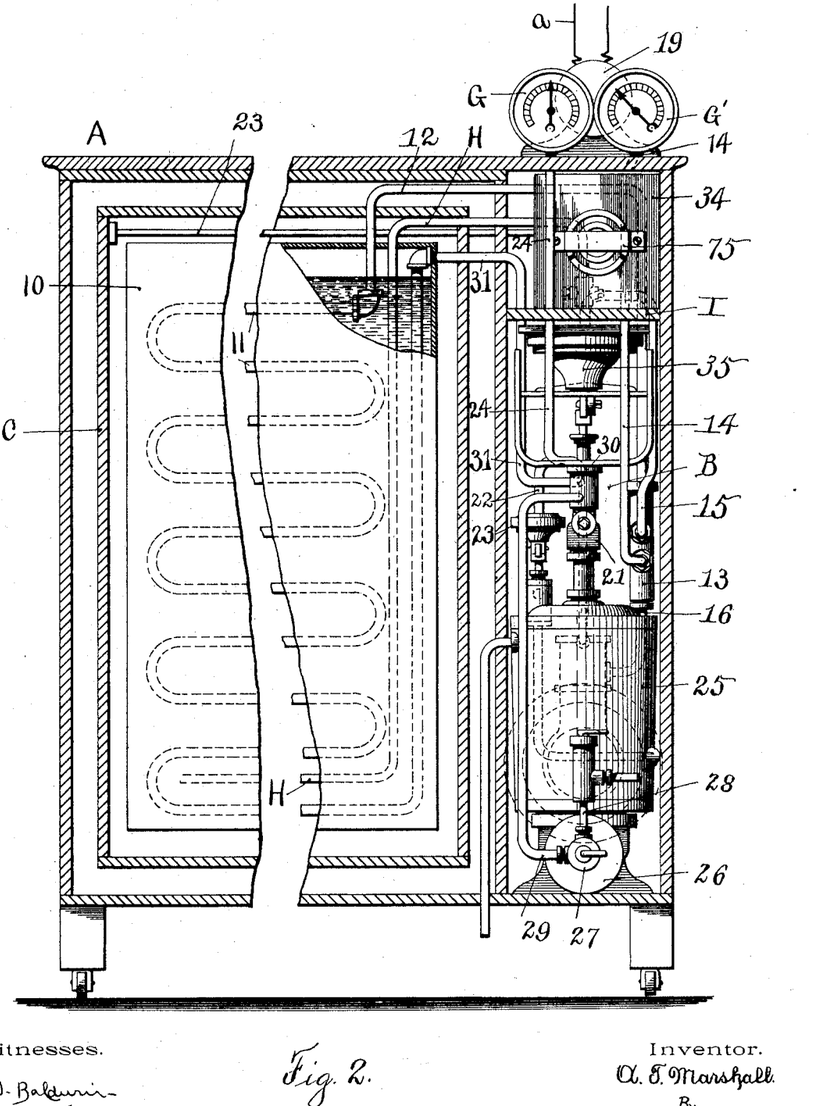
Fig. 2 is a transverse sectional view of the same.

Referring to the first two sheets of drawings and in detail, A designates any of the ordinary or approved forms of casing, which, as illustrated, is divided into compartments B and C, the compartment C being the space which is to be refrigerated and the compartment B being arranged to contain the greater part of my refrigerating apparatus. Mounted in the rear part of the space C to be refrigerated is a flat rectangular brine-tank 10, containing the expansion pipes or coils 11. The outlet-pipe 12 from the expansion-coils 11 is connected to a header 13. A shut-off valve is arranged in the upper part of the header 13, and leading from said header 13 is a pipe 14, connected to a pressure-gage G', a pipe 15, which connects to one of the diaphragm-chambers which control the expansion-valve, regulating the admission of refrigerating medium to the expansion-pipes 11, and a pipe 16, which is connected to the suction side of a pump or condenser 17. The pump 17 may be driven in any of the ordinary or preferred manners, and, as illustrated, the same is preferably driven by a belt 18 from an electric motor 19, secured on top of the casing A. The pressure side of the pump 17 is connected by a pipe 20 to a header 21. Leading from the header 21 is a pipe 22, connected to a diaphragm-chamber 23, which contains the diaphragm for automatically controlling the circulation of water in the cooling-chamber, a pipe 24, which leads up to a second pressure-gage G, and a pipe 240, which leads down to a coil located in the cooling-chamber 25. The header 21 may be provided at one end with one of my ammonia-shut-off valves. From the coil or worm in the cooling-chamber 25 the condensed refrigerating medium passes into a storage tank or chamber 26. The tank 26 is provided at its end with a head 27, having an ammonia-shut-off valve. Leading from the head 27 is a filling or blow-off pipe 28, which is closed at its end by means of another one of my ammonia-shut-off valves. Also leading up from the head 27 is a pipe 29, which connects to the expansion-valve 30. Leading from the expansion-valve 30 is a pipe 31, which connects to the inlet side of the expansion-coil 11.

In the operation of a refrigerating apparatus as thus constructed the ammonia or other refrigerating medium will be drawn by the pump 17 from the expansion-pipes 11 in the form of a gas and will be condensed in the cooling-chamber 25 to a liquid. The circulation of water around the coil inside of the cooling-tank 25 will be automatically controlled, as hereinafter explained. From the storage-tank 26 the ammonia or other refrigerating medium will pass in the form of a liquid to the expansion-valve 30, said expansion-valve 30 being, as hereinafter explained, automatically controlled to regulate the admission of the refrigerating medium to the expansion-pipes 11, where the ammonia again expands into the form of a gas and cools the brine in the tank 10.

In order to maintain a constant temperature in the refrigerated space C, I preferably mount a hard-rubber expansion thermostatic rod 32 in the space to be refrigerated and combine said thermostatic rod with a spring-actuated rheostat to control the electric motor 19. Instead of mounting the expansion-rod or thermostatic rod 32 in the space to be refrigerated the same may be immersed in the brine-tank, and when thus located the thermostatic rod 32 and the devices controlled thereby will maintain the brine at a constant temperature.

Figures 3, 4:
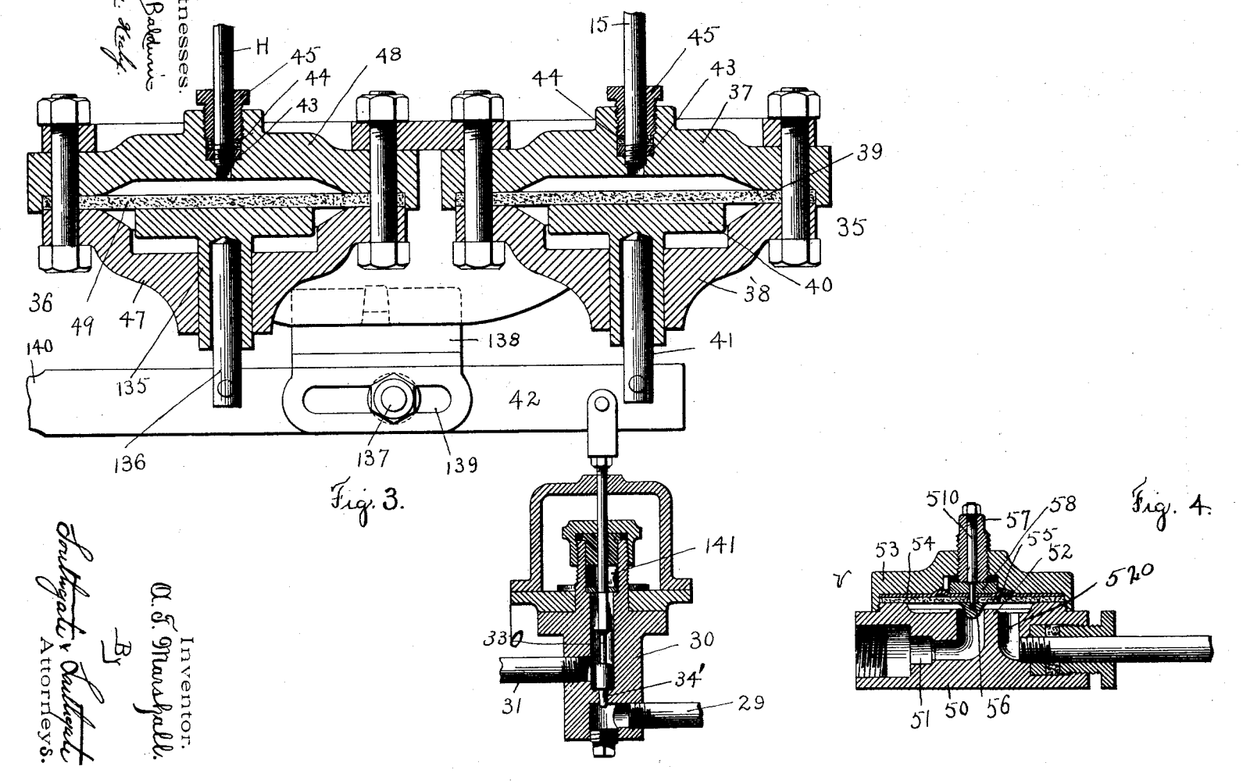
Fig. 3 is a detail sectional view illustrating the form of automatic valve which I preferably employ for regulating the admission of the refrigerating medium to the expansion-pipes.
Fig. 4 is a detail sectional view illustrating the form of hand-valve which I preferably employ for controlling the refrigerating medium.
Figures 5, 8:
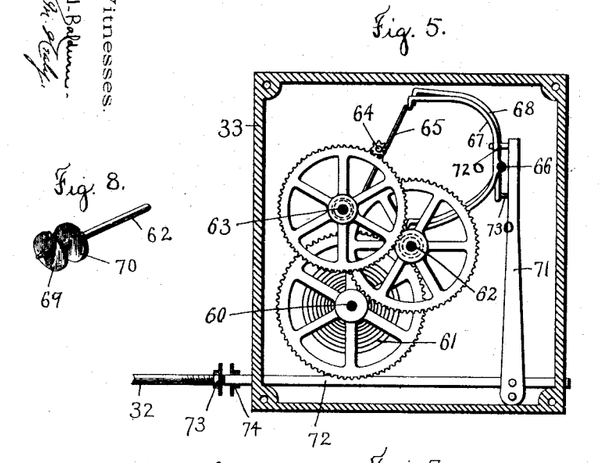

The construction which I employ for automatically operating the expansion-valve 30 is most clearly illustrated in Figs. 1, 2, and 3. As shown in Figs. 1 and 2, a shelf I is located near the upper part of the compartment B. Secured on the under side of the shelf I are the two diaphragm-chambers 35 and 36. The pipe 15, before referred to, is connected to the diaphragm-chamber 35. A small closed pipe or vessel H is located in the brine-tank and is provided with a blow-off valve or header $h$, by means of which liquid anhydrous ammonia or other expansible medium can be introduced therein. The pipe H connects to the diaphragm-chamber 36. The construction of the diaphragm-chambers 35 and 36 and the connections for operating the valve 30 are most clearly illustrated in Fig. 3. As shown in this figure, the diaphragm-chamber 35 is formed by two castings 37 and 38.

Clamped in position between the castings 37 and 38 is a flexible rubber diaphragm 39. Below the flexible diaphragm 39, in position to be actuated thereby, is a follower 40, which is provided with a socket for receiving a stud 41, said stud 41 being pivotally connected at its lower end to a lever 42.

In order to form a tight joint between the pipe 15 and the casting 37, I preferably thread a wrought-iron washer 43 onto the end of the pipe H and arrange a rubber packing-washer 44 between the wrought-iron washer 43 and a bushing 45, threaded into the casting 37. This form of connection I have found in practice affords a very simple and inexpensive manner of connecting an ammonia-pipe to a valve casing or casting, and I ordinarily employ similar connections wherever an ammonia-pipe is to be tapped into or connected with other fittings or castings.

The diaphragm-casing 36 is formed by the castings 47 and 48, which are of similar form to the castings 37 and 38 and inclose a flexible diaphragm 49, said diaphragm 49 being arranged to act upon a follower 135, which contains a stud 136, also pivotally connected to the lever 42. The lever 42 is pivotally mounted upon a bolt or stud 137, which bolt 137 is adjustably mounted in a slot in a bracket 138 and passes through the slot 139 in the lever 42. By adjusting the bolt or stud 137 in its bracket 138 the leverage exerted by the diaphragms 49 and 39 can be readily and quickly adjusted. The lever 42 is provided at its end with a handle 140, as shown in Fig. 2. The expansion-valve 30 is provided with a valve-stem 330, having a needle or shut-off section 34' for controlling or throttling the flow of the refrigerating medium. The valve-stem 330 extends up through a suitable stuffing-box 141 and is pivotally connected at its upper end to the lever 42.

In the operation of my construction for automatically controlling the expansion-valve as thus arranged the anhydrous ammonia or other expansive medium contained in the closed pipe or chamber H will exert a pressure on the diaphragm 49. If the temperature of the brine in the brine-tank 10 rises, the pressure in the closed pipe or chamber H will increase, and the action of the diaphragm 49 will tend to open the expansion-valve 30 more widely, so as to admit an increased supply of the refrigerating medium to the expansion-pipes 11. Instead of immersing the pipe or chamber H in the brine-tank it is obvious that the same may be simply located in the space to be refrigerated; but in all cases the expansion-coil 11 and the closed coil or chamber H should have their external surfaces exposed to the same temperature. The pressure in the expansion-coil 11 is transmitted through the pipe 15 to act on the flexible diaphragm 39, and when the said pressure becomes abnormally large it will tend to close the expansion-valve 30.

By changing the position of the pivot of the lever 42 a given pressure in the closed pipe or chamber H may be made to balance any desired pressure in the expansion-coil 11.

The pressure of the ammonia or other expanding agent in the expanding-coil 11 and in the closed pipe or chamber H depends directly upon their temperatures, and consequently any desired difference of temperature can be maintained between the refrigerating medium in the expansion-coils and the expansion medium in the closed pipe or chamber H while the pump is working. Whenever the pump stops, the pressure in the expansion-coil 11 soon rises to that maintained in the closed pipe or chamber H, and I so adjust the pivot of the lever 42 that this rise in temperature and consequent rise in pressure will always be sufficient to close the expansion-valve, and the expansion-valve will remain closed until the pump has been started and has run long enough to reduce the pressure in the expansion-coil to the difference for which it was set, and as the pump continues to run the pressure in the expansion-coil 11 gradually falls as the brine cools. As thus arranged my expansion-valve will be automatically operated in precisely the same way that an expansion-valve would be worked by hand to obtain the best results—that is to say, the expansion-valve is always closed when the pressures in the two coils are alike, regardless of the temperature of the brine-tank.

In order to prevent the valve-stem 33 of the expansion-valve 30 from becoming stuck in place, the expansion-valve may be occasionally flushed out by operating the handle 140.

The form of shut-off valve which I employ at various points in my ammonia-circulating system is most clearly illustrated in Fig. 4. As shown in this figure, the ammonia-shut-off valve $v$ comprises a casing 50, having an inlet-passage 51, leading to a valve-seat 52, and an outlet-passage 520. Threaded onto the casing 50 is a cover-plate 53, and secured in place by the cover-plate 53 is a compound diaphragm comprising a flexible metallic diaphragm 54 and a rubber diaphragm 55. Threaded into the cover-plate 53 is an operating-screw 57, which engages a washer 58 to hold the diaphragm firmly down into engagement with its valve-seat. Fitting loosely inside of the operating-screw 57 is a stem 510, which is provided with a head or nut at its upper end and a reduced section at its lower end, which passes through the diaphragms and is threaded into a nut 56 on the under side thereof. In practice I have found that this form of ammonia-shut-off valve provides a very simple and efficient construction for shutting off the flow of ammonia at various points in its circulating system, and while in Fig. 4 I have illustrated simply that form of shut-off valve which is employed, for instance, at the end of the blow-off or filling pipe 28 (shown in Figs. 1 and 2) it is to be understood that the other ammonia-shut-off valves $v$, illustrated at various points of my refrigerating apparatus, are of similar construction, the shape of the valve-casing being simply modified to suit the different locations in which said valves are employed.

Figures 6, 9:
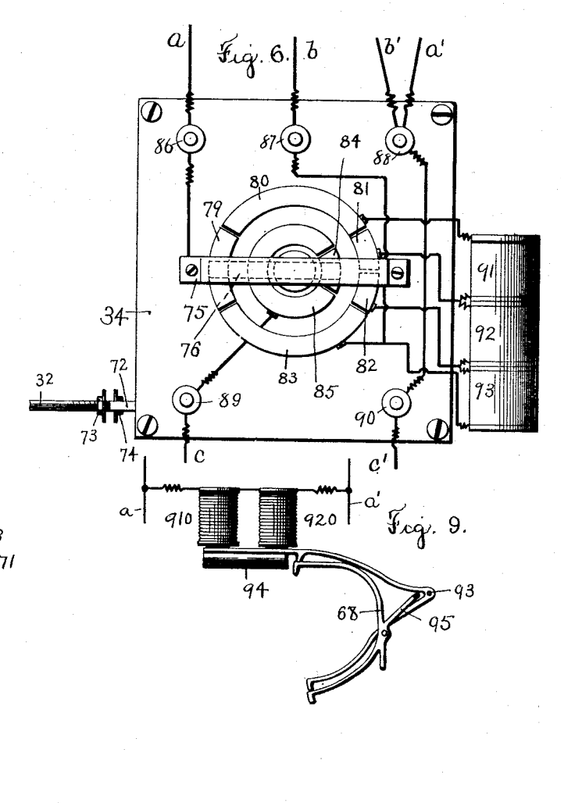
Fig. 6 is a front view of the same.
Fig. 9 is a detail view illustrating a stop mechanism which I may employ to automatically operate the rheostat when the electric current for driving the motor is shut off at the central station or otherwise.
Figure 7:
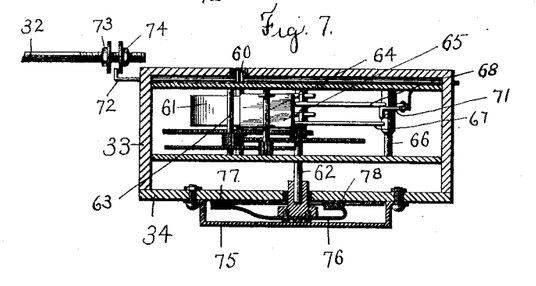
Fig. 7 is a sectional plan view thereof.

The construction which I preferably employ for automatically controlling the motor is most clearly illustrated in Figs. 5 to 9. As shown in these figures, 33 designates a casing having a cover-plate 34, of slate or other insulating material. Mounted on the cover-plate 34 is a rheostat-arm, which is controlled and actuated by spring clockwork mounted inside of the casing 33. As illustrated, the clockwork which I preferably employ for actuating my rheostat comprises a main shaft 60, having a spring 61 coiled thereon. Mounted on the shaft 60 is a gear, which meshes with and drives a pinion secured on a second shaft 62. Mounted on the shaft 62 is a gear, which meshes with and drives a pinion secured on a third shaft 63. A gear on the third shaft 63 meshes with and drives a pinion on a fourth shaft 64. A sheet-metal plate or fan 65 is secured upon the shaft 64. Mounted on a stud 66, near one side of the casing, is a starting-pawl 67 and a stopping-pawl 68. The pawls 67 and 68 are provided at their lower ends with projections or feet for engaging notches in disks 69 and 70, which disks are secured upon the shaft 62, as shown most plainly in Fig. 8. At their upper ends the pawls 67 and 68 are provided with downwardly-extending projections for engaging the fan 65. A lever 71 is pivoted in the casing 33 and is provided with a hook 720 for engaging the starting-pawl 67 and with a pin 730 for engaging a downwardly-extending tailpiece of the stopping-pawl 68. The lever 71 is actuated by means of a slide 72, which at its outer end is provided with an elbow fitting between the stop-nuts 73 and 74, which are adjustably threaded onto the expansion-rod or thermostat 32. The stop-nuts 73 and 74 may be adjusted on the expansion-rod or thermostat 32 to operate the pivoted lever 71 at any desired temperature. When the temperature in the refrigerated space rises so that the thermostatic rod 32 will have expanded sufficiently to shift the lever 71, said lever 71, by means of its hook 720, will raise the starting-pawl 67 out of engagement with its disk 69, and the clockwork will be started in operation and will continue to turn until the foot-piece at the lower end of the stopping-pawl 68 engages its notch in the disk 70. When the temperature in the refrigerated space falls so that the expansion-rod 32 will shift the pivoted lever 71 in the opposite direction, the stopping-pawl 68 will be raised and the clockwork will be started and will continue to turn until the foot-piece at the lower end of the starting-pawl engages with its notch in the disk 69. The notches in the disks 69 and 70 are arranged, as most clearly shown in Fig. 8, so that when the starting-pawl 67 is lifted the shaft 62 will be given approximately three-quarters of a turn, and when the stopping-pawl 68 is lifted the shaft 62 will be given substantially a quarter of a turn. As shown most clearly in Fig. 7, an insulating-bushing is loosely splined on the end of the shaft 62 and carries a spring contact-arm 76. The spring contact-arm 76 is provided at its ends with contact-sections 77 and 78 and engages with and is confined in position by means of a metallic bridge-piece 75. As shown most clearly in Fig. 6, the contact-section 77 is arranged to coöperate with sector-shaped contact-pieces 79, 80, 81, 82, and 83, and the contact-piece 78 is arranged to coöperate with sector-shaped contact-pieces 84 and 85. As thus mounted, the arm 76 will exert a spring-pressure both on its contact-pieces 77 and 78 and on the bridge-piece 75, and by means of this construction I obtain nearly perfect electrical connections between the bridge-piece 75 and the spring 76 and between the contact-pieces 77 and 78 and the sector-shaped contact-pieces with which they coöperate. Binding-posts 86, 87, 88, 89, and 90 are mounted on the cover-plate 34 of the casing 33. The wires $a$ and $a'$, carrying the current for operating the motor, are connected to the binding-posts 86 and 88, respectively. The wires $b$ and $b'$, which connect with the armature of the electric motor 19, are connected to the binding-posts 87 and 88, respectively. The wires $c$ and $c'$, which are connected to the field-magnets of the electric motor 19, are connected to the binding-posts 89 and 90, respectively. The sector-shaped contact-sections 79 and 84 are insulated or without electric connections, so that when the contact-arm 76 is in the position illustrated in Fig. 6 the current will be entirely shut off from the motor 19. The sector-shaped contact-sections 80, 81, and 82 are connected to suitable connected resistance-coils 91, 92, and 93, respectively, so that as the contact-arm 76 is rotated or turned to the right, as shown in Fig. 6, the armature-current will be first sent through all said resistance-coils, and said coils will then be successively cut out from the circuit in the ordinary manner, so that when the contact-arm 76 has made substantially three-quarters of a revolution the full strength of the current will be turned onto the field-magnets and armature of the motor 19, and the pump will be started at full speed.

It is obvious, of course, that the thermostatic rod 32 could, if desired, be arranged simply to make and break the current for starting and stopping the motor 19; but I have found in practice that where such a construction is employed the armature of the motor will be quickly burned out and injured, whereas by combining my thermostat with a spring-controlled rheostat I have provided a construction which will start the motor up gradually, so that the armature of the same will not be injured or burned out.

If the current in the street should be temporarily shut off for any reason, so that the temperature in the refrigerated space should rise, the rheostat would be shifted to start the motor and drive the same at full speed, and the parts remaining in this position, if the current should then again be turned on at the central station or otherwise, the armature of the motor 19 would be liable to be burned out or injured, and in some cases I contemplate providing an automatic cut-out for automatically shifting the rheostat to a stopping position whenever the electric current is so cut off, and I have illustrated such a construction in Fig. 9. As shown in this figure, a shunt from the wires $a$ and $a'$ is carried around the electric magnets 910 and 920, so as to normally hold up a weight 94, carried by a supplemental cut-out pawl 940, pivoted on a stud 93. The supplemental cut-out pawl 940 is provided with projections or foot-pieces 950, corresponding with the projections of the starting-piece 67. The notched disk 69, which coöperates with the main starting-pawl 67, may be made wide enough to coöperate with the foot-piece at the lower end of the supplemental pawl 940, or the supplemental pawl 940 may be arranged to engage a separate notched disk corresponding with the notched disk 69 and secured on the same shaft therewith, as shown in my companion application for patent filed August 29, 1898, Serial No. 689,749. When this arrangement is employed and the current in the street fails or is shut off for any reason, the magnets 910 and 920 will be demagnetized, the weight 94 will fall, the stopping-pawl 68 will be lifted as the supplemental pawl 940 is arranged to engage a pin carried by an arm 95 of said pawl 68, and the clockwork will thus be automatically started by the failure or shutting off of the current in the street to automatically turn the rheostat-arm to the position illustrated in the drawings, thus cutting out the motor.

Figure 10:
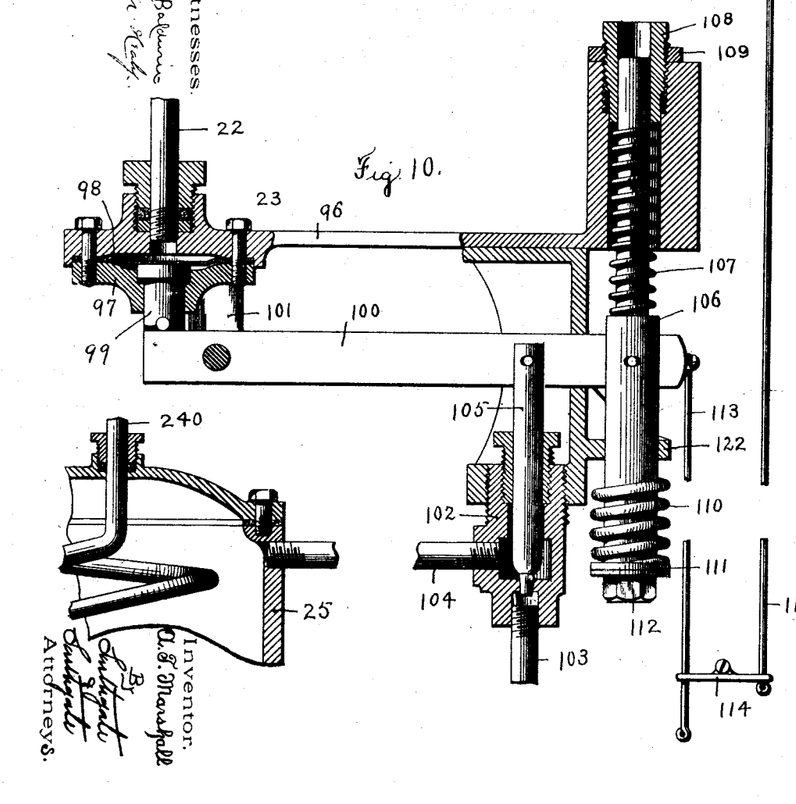
Fig. 10 is a detail view illustrating the construction which I preferably employ for controlling the water circulation.

The means which I preferably employ for automatically controlling the circulation of water in the cooling-tank 25 are most clearly illustrated in Fig. 10. As shown in this figure, the diaphragm-chamber 23 is formed by means of a bracket or casting 96, having a cover-plate 97, bolted thereto. A flexible diaphragm 98 is mounted in the diaphragm-chamber so as to be actuated by the pressure from pipe 22. Engaging the under side of the flexible diaphragm 98 is a plunger 99, engaging one end of a lever 100, pivotally mounted in a bracket or support 101. Near its opposite end the lever 100 is connected to a valve-stem 105, which extends down into a valve-casing 102 and is provided at its lower end with a needle section or valve for controlling the flow of water through a water-inlet pipe 103. From the valve-casing 102 a pipe 104 leads to the cooling-chamber 25. Mounted on the outer end of the pivoted lever 100 is a rod 106, carrying a coiled spring 107, which engages a threaded bushing 108, which bushing may be secured in its adjusted position in a socket in the bracket 96 by means of a check-nut 109. In the normal operation of this construction the tension of the spring 107 is adjusted so that when the pressure in the worm or coil inside the cooling-chamber 25 rises above the desired point the water-valve 102 will be opened and a supply of water will be admitted to the cooling-chamber 25.

In certain cases it might happen that the supply of water to the controlling-valve 102 might be shut off or might for some reason fail, and if the pump 17 should be continued in operation a dangerous pressure might perhaps be generated in the coil inside of the cooling-chamber 25. In order to prevent an accident of this kind from happening, I provide a safety cut-out device for automatically stopping the electric motor 19 when the water-supply fails.

Figure 11:
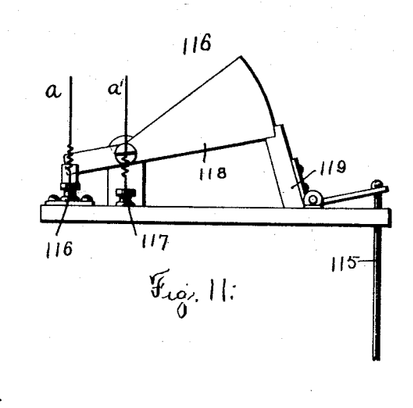
Fig. 11 is a detail view of a safety cut-out which I may employ for stopping the pump when the supply of water is cut off.

As illustrated in Figs. 10 and 11, the rod 106 is provided at its lower end with a spring 110, the pressure of which may be adjusted by means of washers 111 and a nut 112. In the normal operation of this construction the spring 110 will be raised into engagement with a stop-piece 122 when the water-valve 102 is opened. Whenever an abnormally heavy pressure is generated in the pipe 22, the pivoted lever 100 will be raised against the resistance of the spring 110. A wire 113 is pivotally secured to the outer end of the lever 100 and extends down through a pivoted yoke 114 and is provided with an abutment at its lower end. When the lever 100 is raised to an abnormally high position, the pivoted yoke 114 will be operated to pull down upon an upwardly-extending wire 115. The wire 115 is connected at its upper end to operate an automatic cut-out, the preferred form of which is most clearly illustrated in Fig. 11. As shown in this figure, the binding-post 117 is introduced into the circuit $a$ of the street and is normally connected by a pivoted connecting-piece 118. The connecting-piece 118 is normally held up by means of a bell-crank stop-lever 119. The wire 115 is connected to the bell-crank lever 119, so that when said wire 115 is pulled down the stop-lever 119 will be moved away from the contact-piece 118, so that the electrical connection between the binding-posts 116 and 117 will be broken and the current will be automatically cut off from the motor 19, which drives the pump.

The operation of the various devices which I employ in my automatic refrigerating apparatus have been so fully described in explaining the construction thereof that a description of the operation of the parts as a whole is thought to be unnecessary.

I am aware that many changes may be made in the construction of refrigerating apparatus by those who are skilled in the art without departing from the scope of my invention as expressed in the claims and that the several features of my invention as expressed in the claims may be used in combination with different classes of refrigerating-machines and in different constructions from that in connection with which they are herein illustrated. I do not desire, therefore, to be limited to the forms which I have shown and described; but What I do claim, and desire to secure by Letters Patent of the United States, is—

1. In a refrigerating apparatus, the combination of expansion-pipes, a pump connected thereto, a storage-chamber for the liquid refrigerating medium, an expansion-valve for regulating the flow of the refrigerating medium to the expansion-pipes, and means for automatically actuating said valve, comprising a lever, means for adjusting the fulcrum of said lever, a diaphragm thermostatically actuated by the pressure of a confined body of expansible medium and connected to the lever at one side of its fulcrum, and a diaphragm acted upon by the pressure of the refrigerating medium in the expansion-pipes connected to the lever at the opposite side of its fulcrum, substantially as described.

2. In a refrigerating apparatus, the combination of a brine-tank 10, the expansion-pipes 11 therein, a single valve 30 regulating the flow of the refrigerating medium to the pipes 11, and means for automatically controlling the valve 30, comprising a bracket 138, a stud 137 adjustably mounted therein, a lever 42 pivoted on the stud 137, a diaphragm 49 connected to act on one side of the lever 42, a pipe H containing an expansible medium for actuating the diaphragm 49 immersed in the tank 10, and a diaphragm 39 actuated by the pressure in the pipes 11 connected to act on the other side of the lever 42, substantially as described.

3. In a refrigerating apparatus, the combination of a circulating system for the refrigerating medium, a pump, an electric motor therefor, and a combined thermostat and rheostat for controlling the motor to maintain a substantially constant temperature in the space to be refrigerated, substantially as described.

4. In a refrigerating apparatus, the combination of expansion pipes or coils for allowing a volatile refrigerating medium to expand into the form of a gas, a pump connected thereto, a storage-chamber for liquid refrigerating medium, water-supplying connections for cooling the refrigerating medium while the same is being condensed to liquid form, a valve for throttling the water-supply, and means controlled by the pressure generated by the pump for automatically actuating said valve, substantially as described.

5. In a refrigerating apparatus, the combination of expansion pipes or coils for allowing a volatile refrigerating medium to expand into the form of a gas, a pump connected thereto, a storage-chamber for liquid refrigerating medium, water-supplying connections for cooling the refrigerating medium while the same is being condensed to liquid form, a valve for throttling the water-supply, means for stopping the pump and a diaphragm controlled by the pressure generated by the pump connected to normally control said valve and to automatically stop the pump when an abnormal pressure is generated thereby, substantially as described.

6. In a refrigerating apparatus, the combination of expansion pipes or coils for allowing a volatile refrigerating medium to expand into the form of a gas, a pump connected thereto, a storage-chamber for liquid refrigerating medium, water-supplying connections for cooling the refrigerating medium while the same is being condensed to liquid form, a valve for throttling the water-supply, an electric motor for actuating the pump, a cut-out for breaking the motor-circuit, and a single diaphragm controlled by the pressure generated by the pump connected to normally control the water-valve and to automatically actuate the cut-out when an abnormal pressure is generated by the pump, substantially as described.

7. In a refrigerating apparatus, the combination of a circulating system for the refrigerating medium, a pump therefor, an electric motor actuating said pump, a cut-out for said electric motor, water-supplying connections for cooling the circulating medium, and a flexible diaphragm acted upon by the pressure of the refrigerating medium to normally control the water-supplying connections and to actuate the cut-out when an excessive pressure is generated by the pump, substantially as described.

8. In a refrigerating apparatus, the combination of a circulating system for the refrigerating medium, a pump, an electric motor for actuating the pump, water-supplying connections for cooling the refrigerating medium, a diaphragm acted upon by the pressure of the refrigerating medium, a lever 100 controlled by said diaphragm, a spring 107 acting against said diaphragm, and a supplemental spring 110, said spring being arranged to normally form a stop for the lever 100, and being arranged to yield under excessive pressures to permit the operation of connections for cutting out the electric motor, substantially as described.

In testimony whereof I have hereunto set my hand in the presence of two subscribing witnesses.

ALBERT T. MARSHALL.

Witnesses:
   PHILIP W. SOUTHGATE,
   LOUIS W. SOUTHGATE.